United States Patent
Sohmshetty et al.

(10) Patent No.: US 8,775,010 B2
(45) Date of Patent: Jul. 8, 2014

(54) SYSTEM AND METHOD OF CONDUCTING VEHICLE USAGE DATA ANALYSIS

(75) Inventors: Raja Shekar Sohmshetty, Canton, MI (US); Zhiyong Cedric Xia, Canton, MI (US); Krishnaswamy Venkatesh Prasad, Ann Arbor, MI (US); Matthew John Zaluzec, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 148 days.

(21) Appl. No.: 13/108,110

(22) Filed: May 16, 2011

(65) Prior Publication Data

US 2012/0296514 A1    Nov. 22, 2012

(51) Int. Cl.
*G01M 17/00* (2006.01)
*G06F 7/00* (2006.01)
*G06F 17/30* (2006.01)
*G07C 5/00* (2006.01)
*B60T 8/172* (2006.01)

(52) U.S. Cl.
CPC *G07C 5/008* (2013.01); *B60T 8/172* (2013.01)
USPC ....... 701/30.2; 701/29.1; 701/29.3; 701/29.4; 701/31.4; 701/31.5; 700/30; 700/108; 700/110; 700/171; 707/776; 707/790

(58) Field of Classification Search
USPC ............ 701/29.1–34.4; 700/28–32, 108, 110, 700/171; 707/776
See application file for complete search history.

(56) References Cited

U.S. PATENT DOCUMENTS

| | | | |
|---|---|---|---|
| 6,609,051 B2 * | 8/2003 | Fiechter et al. | 701/29.3 |
| 8,359,134 B2 * | 1/2013 | Maesono | 701/29.1 |
| 8,543,287 B2 * | 9/2013 | Stevens et al. | 701/33.4 |
| 2009/0240391 A1 * | 9/2009 | Duddle et al. | 701/33 |
| 2010/0057511 A1 * | 3/2010 | Mansouri et al. | 705/7 |
| 2010/0152960 A1 * | 6/2010 | Huber et al. | 701/33 |
| 2010/0152962 A1 * | 6/2010 | Bennett et al. | 701/33 |
| 2010/0179844 A1 * | 7/2010 | LaFergola et al. | 705/7 |
| 2011/0093105 A1 | 4/2011 | Sohmshetty et al. | |
| 2011/0093107 A1 | 4/2011 | Sohmshetty et al. | |
| 2011/0264318 A1 * | 10/2011 | LaForge et al. | 701/22 |

* cited by examiner

*Primary Examiner* — Thomas Tarcza
*Assistant Examiner* — Tyler J Lee
(74) *Attorney, Agent, or Firm* — Damian Porcari; Brooks Kushman P.C.

(57) ABSTRACT

A method of conducting vehicle usage data analysis is provided. The method includes providing usage data about at least one vehicle to a database. The usage data may be analyzed and compared to a member of a set of vehicle development models to determine whether to update a vehicle development model. The usage data may also be analyzed to determine whether to transmit a communication to a vehicle.

20 Claims, 1 Drawing Sheet

SYSTEM AND METHOD OF CONDUCTING VEHICLE USAGE DATA ANALYSIS

TECHNICAL FIELD

The present invention relates to a system and method of conducting vehicle usage data analysis.

SUMMARY

In at least one embodiment, a method of conducting vehicle usage data analysis is provided. The method includes providing usage data about plurality of vehicles to a database. A member of a set of vehicle development models that is associated with the usage data is selected. The usage data is analyzed to obtain an analysis result. The selected member of the set is compared to the analysis result. A determination is made whether to modify the member of the set based on differences between the member of the set and the analysis result.

In at least one embodiment, a method of conducting vehicle usage data analysis is provided. Usage data is obtained about a set of vehicles from a data source. The usage data is provided to a database. The usage data is aggregated by a data type. The usage data is analyzed to obtain an analysis result. A model database is provided that has set of vehicle development models that include design information about a vehicle component or system. A member of the set of vehicle development models is selected that is associated with the data type. The member of the set of vehicle development models is compared to the analysis result to determine whether to modify the member of the set of vehicle development models. The member of the set of vehicle development models is modified when a determination is made to modify the member of the set of vehicle development models.

In at least one embodiment, a method of conducting vehicle usage data analysis is provided. Usage data about a vehicle is provided to a database that is located remotely from the vehicle. A determination is made whether immediate analysis of the usage data is desired. The usage data is analyzed to generate an analysis result when immediate analysis is desired. A determination is made whether a communication condition exists based on the analysis result. A communication is transmitted to the vehicle when a communication condition exists.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
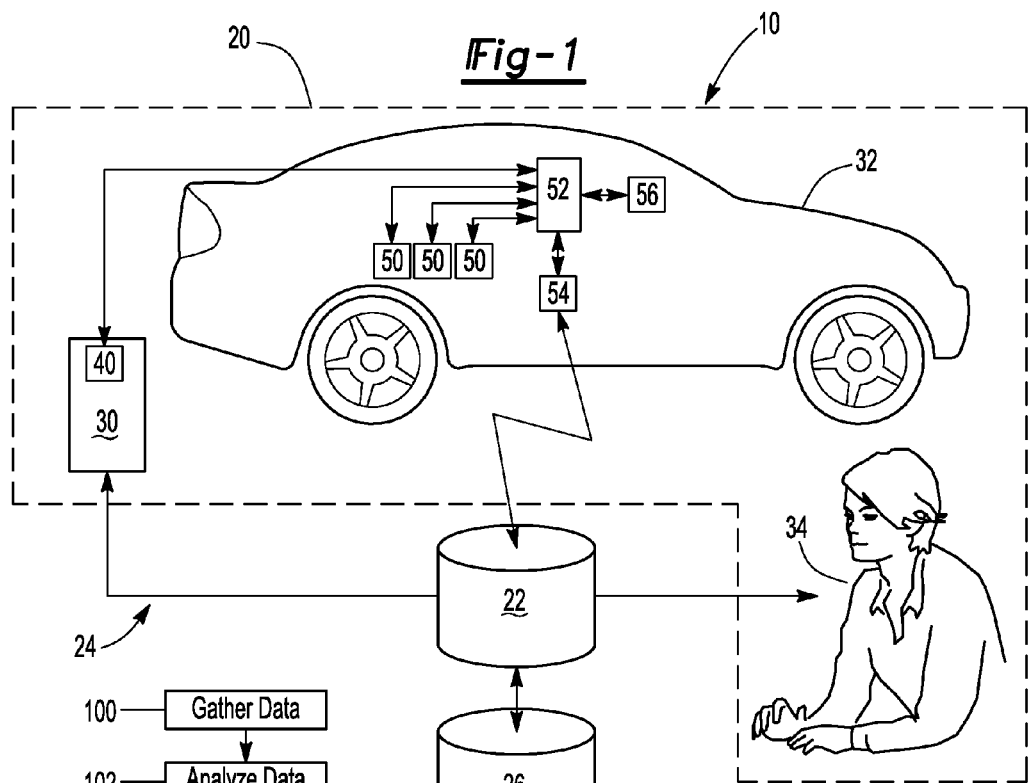
FIG. 1 is a schematic of an exemplary vehicle usage data analysis system.

Referring to FIG. 1, a schematic of an exemplary vehicle usage data analysis system 10 is shown. The system 10 may be used to gather, analyze, and apply data or information about one or more vehicles. The vehicles may be actual vehicles that have been produced, sold to a customer, and are in use under real-world operating conditions. As will be discussed in more detail below, data may be applied to an existing vehicle or to models that are used to develop and design vehicles.

The system 10 may include a plurality of data sources 20 that may provide information to a computer database 22 via a communication network 24. The database 22 may be remotely located from the data sources and accumulate data from or about multiple vehicles distributed across a geographic region. In addition, the system 10 may include a computerized model database 26 that may utilize data from the database 22 to affect the design and development of vehicles or their components. The model database 26 may be separate from the database 22 and may be developed and used by a vehicle manufacturer to store information regarding existing components and manufacturing processes used to make and test a vehicle model, such as a motor vehicle like a car or truck. Vehicle attribute data provided or obtained by a data source 20 may be classified by data type or data communication method. Such classifications may overlap. For instance, one type of data may be obtained from multiple sources or may be communicated in multiple ways. For convenience, the discussion of vehicle attribute data found below is organized by entities that may provide data to the database 22. The data sources 20 may include one or more network service providers 30, vehicles 32, and vehicle users 34.

A network service provider 30 may be an entity that services a vehicle, such as a dealership or repair shop. A network service provider 30 may gather data about a vehicle and provide data to the database 22.

The data gathered by a network service provider 30 may be qualitative and/or quantitative. In addition, the data may or may not be obtained from the vehicle 32.

Data obtained from the vehicle 32 may be data that is downloaded or communicated from the vehicle 32 to monitoring or diagnostic equipment 40. Such diagnostic equipment 40 may identify current or past vehicle performance issues. For example, diagnostic equipment 40 may compute error codes based on data from the vehicle 32. In addition, diagnostic equipment 40 may receive real-time or historical data from the vehicle 32 that may include sensor data and/or error codes provided by one or more vehicle control modules that may monitor and control a vehicle system. Data obtained from the vehicle 32 may also include vehicle identification information, such as a vehicle identification number (VIN), vehicle status information, such as mileage, and vehicle configuration information, such as the current version of software used by a control module or the equipment or options included with the vehicle 32.

Data that is not obtained or received from the vehicle 32 may include data related to services provided the service provider 30. Such data may include information regarding what service work was performed, the duration and cost of such service, what components or replacement parts were used, and whether the work performed was done under vehicle warranty. In addition, such data may include vehicle identification information, mileage and configuration information as discussed above. Data may be entered into or provided to computer software that may be adapted to communicate with the database 22 via the communication network 24, such as software that may be used to track or report maintenance activities, warranty claims, and/or dealer part inventories.

The vehicle 32 may also provide data to the database 22. Data may be based on information from one or more sensors 50 disposed on the vehicle 32. The sensors 50 may communicate with or provide data to one or more control modules 52 that may monitor and/or control vehicle operation. A communication system that may include preprogrammed software may be used to facilitate communication of data from the vehicle 32 to the database 22. For example, data may be communicated via a factory-installed, in-car communications system 54, such as SYNC® provided by Ford Motor Company. The in-car communication system 54 may be equipped with or may be configured to communicate with a data entry interface 56, such as a keypad, touchpad or other input device. Communication between the in-car communication system 54 and the database 22 may occur automatically or in response to human intervention. For instance, data may be communicated in real-time or as a batch transfer (using data stored in memory) either in response to preprogrammed commands or user commands. Data may also be communicated indirectly to the database 22, such as via diagnostic equipment 40 as previously discussed.

Data provided by the vehicle sensors 50 and/or the control module 52 may include vehicle identification information, such as a vehicle identification number (VIN) which may be stored in memory, and vehicle configuration information, such as the current version of software used by a control module or the equipment or options included with the vehicle 32. In addition, data may include environmental data (e.g., air temperature, humidity, sun load), and vehicle status information. Vehicle status information may include, but may not be limited to vehicle mileage, tire pressure, coolant temperature, vehicle location, vehicle acceleration, crash sensor data, error codes, suspension loads, suspension spring rates, payload level, acoustic sensor data, multimedia data, steering status, engine status, seat position data, mirror position data, electronic brake system status, and load sensor data (which may be based on load sensors placed on the vehicle body to detect material or weld degradation or failures).

A vehicle user 34 may also provide qualitative and/or quantitative data regarding a vehicle 32. Such data may include vehicle identification information, vehicle status information (e.g., mileage), vehicle configuration information, and information regarding maintenance, repairs, or modifications that were made by the user 34 or an entity that is not a network service provider 30. For example, data provided by a vehicle user 34 may include information regarding changes to the original vehicle configuration, such as the addition of aftermarket parts that may change the functionality, aerodynamics, or performance of the vehicle. Such changes may include the addition of a bed liner, trailer hitch, spoiler, or body side moldings. In addition, information regarding replacement service parts may be gathered to determine whether inferior, modified, or non-approved parts have been used that may not meet vehicle manufacturer specifications. Examples include changes to wheel or tire sizes, changes to the voltage or capacity of the vehicle battery, removal or modifications to sensors, or the addition of electrical components that may affect electrical system operation or performance.

Data may be provided by or obtained from a vehicle user 34 in various ways. For example, a vehicle user 34 may enter data using a data entry interface 56 provided with the vehicle 32. This data may then be transmitted to diagnostic equipment 40 during servicing or may be wirelessly communicated to the database 22 via the in-car communications system 54. In addition, a data entry interface that is not provided with the vehicle 32 may be employed to communicate information to the database 22. Examples include providing data via the Internet (e.g., website or e-mail), a reporting application on a mobile communication device, or by phone. In addition, information may be provided by fax or mail and then input to the database by an intermediary.

Figure 2:
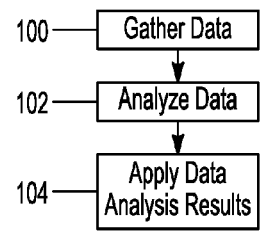
FIG. 2 is a flowchart of a method of conducting vehicle usage data analysis.
Figure 4:
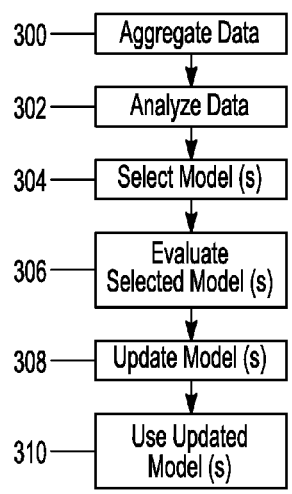
FIG. 4 is a flowchart of a method of analyzing and applying data analysis results to vehicle design and development models.
Figure 3:
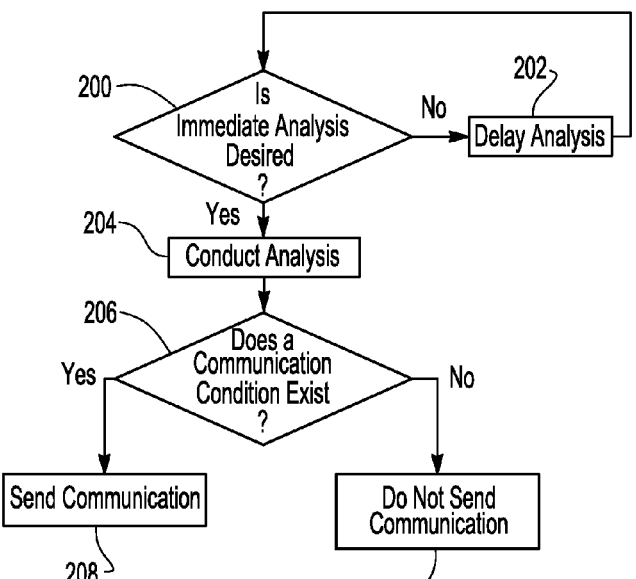
FIG. 3 is a flowchart of a method of analyzing and applying data analysis results to a vehicle.

Referring to FIG. 2, an exemplary flowchart is shown that overviews a method of conducting vehicle usage data analysis. One or more steps of the method may be implemented with a computer or microprocessor based system. First, vehicle attribute data is gathered at block 100. Vehicle attribute data may be obtained from one or more data sources 20 and provided to the database 22 as previously described. Second, the vehicle attribute data is analyzed at block 102. Third, data analysis results are applied at block 104. Steps associated with analysis (block 102) and application of data analysis results (block 104) may vary depending on whether the data analysis results are to be applied to an existing vehicle or vehicle design and development. Exemplary analysis and application steps associated with an existing vehicle are shown in FIG. 3. Exemplary analysis and application steps associated with vehicle design and development are shown in FIG. 4.

Referring to FIG. 3, a flowchart is shown that illustrates and exemplary method of analyzing and applying data analysis results to a vehicle.

At block 200, the method begins by determining whether immediate data analysis is desired. Immediate data analysis may be desired in predetermined situation, such as for data associated with vehicle safety or vehicle service situations. More specifically, when data is provided to the database, programmed computer code or logic may be used to determine whether the data is associated with an immediate data analysis condition. For instance, the database may compare the data received to preprogrammed data in a lookup table that may designate types of data for which immediate analysis is desired. If immediate analysis is not desired, the method continues at block 202. If immediate analysis is desired, the method continues at block 204.

At 202, data analysis may be delayed until a request for data analysis is initiated. As such, data analysis may occur in response to a request or demand from a vehicle user 34 or after a predetermined amount of time. A vehicle user 34 may request data analysis by submitting a request that is communicated to the database 22. Such a request may be made in the same ways that a vehicle user 34 may enter data, such as via a data entry interface 56, the Internet, a mobile communication device, phone, fax, or mail. An example of data analysis that may be delayed is calculation of a vehicle residual value based on actual usage data.

At 204, data analysis is conducted. Data analysis may be conducted by comparing data to predetermined parameters or processing data before comparing data to one or more predetermined parameters. Data may be processed using predetermined analysis models, statistical analysis, formulas, or simulations. For instance, data may be compared to a threshold value or a threshold value range. An example may be a comparison of payload data to a predetermined maximum payload value. Another example may be a determination that a vehicle component or a fluid such as oil has reached the end of its useful life, which may be based on mileage and/or data from a control module like a powertrain control module. As such, data analysis may facilitate adaptive preventative maintenance that may provide customized maintenance schedules or recommendations that may be tailored to a specific vehicle based on the usage characteristics experienced by that vehicle.

At 206, a determination is made as to whether a communication condition exists. A communication condition may exist if a predetermined value or range is exceeded, which may be indicative of a safety related condition, a condition in which vehicle service is required, or an end of useful life condition. If such a condition exists or if a predetermined value or range is exceeded, the method may continue at block 208. If a communication condition does not exist, the method continues at block 210 where no action is taken to provide information to or alert a vehicle user.

At 208, information is communicated to the vehicle or vehicle user. Information may include sending a message or alarm to the vehicle. Such a message or alarm may be audible, visual, or combinations thereof. Examples of audible messages may include a buzzer, tone or prerecorded vocal message that may be communicated at the vehicle via the communications system 54. Examples of visual messages may include illumination of an indicator light or a text message that provides details about the vehicle condition.

Referring to FIG. 4, a flowchart is shown that illustrates and exemplary method of analyzing and applying data analysis results to vehicle design and development models. As will be discussed in more detail below, vehicle design and development models may be used in the design, development, and testing of vehicle components, subsystems, and systems, such as for future vehicle models and programs that may not yet be commercially available.

At 300, data from multiple vehicles is aggregated. Data may be aggregated by accumulating data in the database 22 from multiple vehicles. The data may be grouped by data type and data source. For instance, data associated with a particular type of sensor reading or error code may be designated for further analysis. Moreover, this data may be separated and accumulated into subsets that are associated with a common vehicle model or common component. As such, subsequent data analysis may provide meaningful information regarding characteristics of a common component or subsystem provided on a particular type of vehicle. Data may be associated with a vehicle model based on the VIN number or other data attribute that may identify the vehicle model or vehicle type to which a data element pertains. In addition, information regarding components or subsystems provided with a vehicle may be provided from vehicular or non-vehicular data source, such as a user or network service provider, or may be preexisting data that is available from the records of the vehicle manufacturer. Data may also be aggregated or subdivided by the location of the vehicle to help group vehicles that may encounter similar environmental conditions.

At 302, the aggregated data is analyzed. Data analysis may include the application of statistical analysis techniques to data associated with one or more sensor readings for a particular type of vehicle or component. For instance, statistical analysis may include calculating a probability distribution and associated descriptors, such as a mean, variance, deviation, or correlations, determination of maximum or minimum values, and so on. Data analysis may also include the execution of simulations or execution of preprogrammed analysis algorithms or subroutines.

At 304, one or more existing or pre-established vehicle development models may be selected for comparison to the data analysis results. In one or more embodiments, this step may occur before, after or simultaneously with block 306. Existing vehicle development models may be provided as part of a model database 26 that includes various models used to design, develop, or test vehicles, vehicle components, or vehicle subsystems. Vehicle development models may include part models, material models, joint models, and load models. Part models may include geometric information pertaining to a part or subassembly. Material models may include information pertaining to material properties of a part or subassembly. Joint models may include information regarding components and processes used to assemble components or subsystems to each other. Load models may include vehicle load data believed to be representative of the force loads and vibrations that a type or model of vehicle may experience while in use. Existing vehicle development models may be abstractions that may be based on simulations.

Selection of a model may be manually determined or may be predetermined based on the type of data associated with the data analysis results. For instance, information from vehicle load or vibration sensors that is indicative of real-world forces or vibrations experienced by a plurality of similarly configured vehicles may be associated with an existing load model for that vehicle via a software algorithm.

At 306, data analysis results are evaluated with respect to one or more vehicle development models. Evaluation may include a comparison of data analysis results to at least one selected model. Comparison of data analysis results to a selected model may be used to assess whether an existing vehicle development model is sufficiently representative of real-world operating conditions. The results of a comparison may result in no modifications to the model or revisions to the model.

No modifications may be made to the model when the model and data analysis results are sufficiently similar. The determination of whether the model and data analysis results are sufficiently similar may be made using statistical analysis techniques and/or user judgment. For instance, real world load data may be sufficiently similar to load data in a development model based on a comparison of maximum and minimum values, or an average or other combination of maximum and minimum values in the data analysis sample.

At block 308, updates are made to one or more models if appropriate. Modifications or revisions may be made to a model when one or more portions of the model are not sufficiently similar to the data analysis results. As an example, a load data model may have a minimum value that may be sufficiently similar to the data analysis results and a maximum value that is not sufficiently similar. In such a situation, the maximum value in the model may be changed while the minimum value is not changed. As another example, a part model may be updated when a part is redesigned in response to data analysis results (e.g., due to a high failure or replacement rate or updated finite element analysis results based on a revised load data model). A model may also be replaced when the model is not sufficiently similar to the data analysis results. The determination of whether the model and data analysis results are not sufficiently similar may be made using statistical analysis techniques and/or user judgment. In such a situation, the data set or model attributes upon which a model is based may be replaced with the data analysis results. For instance, a load model may have maximum and minimum values that significantly differ from the data analysis results. The data analysis results may then be used to replace previous model parameters.

At 310, the updated models are used in vehicle development and design activities. Vehicle development and design activities may include both the development of new vehicles models that are not yet in production as well as developing solutions to problems or issues revealed through data analysis. For example, warranty or service information as well as reanalysis of existing components or subsystems using updated vehicle development models may reveal design improvement opportunities, or "underdesign" situations in which a component fails prematurely. As such, components may be redesigned to improve durability. Similarly, updated models and data analysis may be used to reveal "overdesign" situations in which a component or subsystem is designed to withstand usage well beyond that which is experienced in actual use. For instance, a part model may be reanalyzed using an updated load model to assess durability. The part model may then be modified or undergo a cost-benefit analysis to determine whether a different design will withstand usage under updated load conditions with respect to predicted warranty costs or incremental part costs. Similarly, data analysis may reveal that a vehicle is designed for a wider variance of conditions than is reasonably expected. For instance, a model may be revised to design for a smaller variance of users or use conditions. For example, a component or subsystem may be designed for a smaller confidence interval or percentile of users, such as by designing for an $80^{th}$ percentile and increasing maintenance rather than designing for the $95^{th}$ percentile.

Analyzing and applying data analysis results to a vehicle or vehicle design and development models may result in improved model or modeling accuracy. Improved modeling accuracy may facilitate better vehicle and component designs by improving product robustness, reducing warranty costs, providing improved customer satisfaction, providing product or service differentiation (e.g. adaptive preventative maintenance).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of conducting vehicle usage data analysis, comprising:
    storing usage data about a plurality of vehicles in a database with a computer;
    selecting a member of a set of vehicle development models that is stored in a model database and that is relevant to the usage data;
    comparing the usage data to the member of the set of vehicle development models that is selected with the computer to obtain a comparison result that is indicative of differences between the usage data and the member; and
    determining at the computer whether to modify the member based on the comparison result; and
    executing the member of the set of vehicle development models to design a new vehicle component for a future vehicle that is not yet commercially available.

2. The method of claim 1 wherein the set of vehicle development models is stored in a model database that communicates with the database.

3. The method of claim 1 wherein the set of vehicle development models includes a part model that includes part geometry information.

4. The method of claim 1 wherein the set of vehicle development models includes a material model that includes data regarding a material used to make a vehicle part.

5. The method of claim 1 wherein the set of vehicle development models includes a joint model that includes data regarding components and processes used to assemble vehicle parts.

6. The method of claim 1 wherein the set of vehicle development models includes a load model that includes data associated with vehicle load forces or vibration inputs.

7. The method of claim 1 wherein the step of determining whether to modify the member of the set further comprises modifying the member of the set to produce a modified model when there are statistically significant differences between the member of the set and the comparison result.

8. The method of claim 7 further comprising using the modified model to design a vehicle component for a future vehicle program.

9. A computer implemented method of conducting vehicle usage data analysis, comprising:
    obtaining usage data about a set of vehicles from a data source;
    receiving the usage data at one or more computers;
    storing the usage data in a database with the one or more computers;
    aggregating the usage data by a data type in the database with the one or more computers;
    statistically analyzing aggregated usage data with the one or more computers to obtain an analysis result;
    providing a model database having set of vehicle development models that include design information about a vehicle component or system;
    selecting with the one or more computers a member of the set of vehicle development models that is relevant to the data type;
    comparing with the one or more computers a selected member of the set of vehicle development models to the analysis result to obtain a comparison result defining differences between the usage data and the selected member of the set;
    determining with the one or more computers whether to modify the selected member of the set of vehicle development models based on the comparison result;
    modifying the member of the set of vehicle development models when a determination is made to modify the member of the set of vehicle development models; and
    executing members of the set of vehicle development models to design a new vehicle component for a future vehicle that is not yet commercially available.

10. The method of claim 9 wherein the data source includes the set of vehicles that wireles sly communicate data to the database via a factory installed in-vehicle communication system.

11. The method of claim 10 wherein each member of the set of vehicles includes a plurality of sensors that provide usage data to a control module that communicates with the in-vehicle communication system.

12. The method of claim 9 wherein the data source includes a network service provider that provides a maintenance service to a vehicle.

13. The method of claim 12 wherein the network service provider obtains usage data from a vehicle using diagnostic equipment and wherein the usage data is communicated from the diagnostic equipment to the database via a communication network.

14. The method of claim 9 wherein the data source is a vehicle user that provides usage data via a data interface provided with the vehicle.

15. A computer implemented method of conducting vehicle usage data analysis, comprising:

providing usage data about a vehicle to a database that is located remotely from the vehicle;

determining with one or more computers whether immediate analysis of the usage data is desired;

analyzing the usage data with the one or more computers to generate an analysis result when immediate analysis is desired;

determining with the one or more computers whether a communication condition exists based on the analysis result; and transmitting a communication from the one or more computers to the vehicle when a communication condition exists.

16. The method of claim 15 wherein immediate analysis is desired when the usage data relates to a predetermined safety condition.

17. The method of claim 15 wherein analyzing the usage data is delayed until a request is received from a vehicle user when immediate analysis of the usage data is not desired.

18. The method of claim 15 wherein a communication condition exists when the analysis result exceeds to a predetermined value indicative of a recommendation to service the vehicle.

19. The method of claim 15 wherein the communication is wirelessly transmitted to a factory installed communication system disposed in the vehicle.

20. The method of claim 19 wherein the communication system provides an audible and visual message to a vehicle user based on the analysis result.

* * * * *